US007782398B2

(12) United States Patent
Chan et al.

(10) Patent No.: US 7,782,398 B2
(45) Date of Patent: Aug. 24, 2010

(54) DISPLAY PROCESSOR INTEGRATED CIRCUIT WITH ON-CHIP PROGRAMMABLE LOGIC FOR IMPLEMENTING CUSTOM ENHANCEMENT FUNCTIONS

(76) Inventors: Thomas M. Chan, 20318 Miljevich Dr., Saratoga, CA (US) 95070; Harry J. Raftopoulos, 2234 Laurel Dr., Santa Clara, CA (US) 95050; Andrew K. Chan, 717 Gailen Ave., Palo Alto, CA (US) 94303

( * ) Notice: Subject to any disclaimer, the term of this patent is extended or adjusted under 35 U.S.C. 154(b) by 1326 days.

(21) Appl. No.: 10/235,628

(22) Filed: Sep. 4, 2002

(65) Prior Publication Data
US 2004/0041918 A1   Mar. 4, 2004

(51) Int. Cl.
*H04N 5/44*      (2006.01)
*H04N 9/64*      (2006.01)

(52) U.S. Cl. .................. 348/553; 348/714; 348/554

(58) Field of Classification Search ................. 348/553, 348/554, 576, 577, 222.1, 714, 239, 625, 348/241, 607, 252, 231.99, 231.7; 716/16, 716/17; 326/37, 38, 39; 712/32, 37, 36; 711/103; 257/530
See application file for complete search history.

(56) References Cited

U.S. PATENT DOCUMENTS

| 4,472,740 A * | 9/1984 | Doi .............................. 348/361 |
| 4,625,311 A | 11/1986 | Fitzpatrick et al. |
| 5,019,903 A | 5/1991 | Dougall et al. |
| 5,027,203 A | 6/1991 | Samad et al. |
| 5,065,144 A * | 11/1991 | Edelson et al. .............. 345/555 |
| 5,093,721 A | 3/1992 | Rabii |
| 5,162,907 A | 11/1992 | Keating et al. |
| 5,206,184 A * | 4/1993 | Allen et al. ................. 438/587 |
| 5,241,281 A * | 8/1993 | Wilkes et al. ................ 345/213 |
| 5,241,659 A * | 8/1993 | Parulski et al. .............. 345/589 |
| 5,365,604 A | 11/1994 | Kwok et al. |
| 5,410,356 A | 4/1995 | Kikuchi et al. |
| 5,428,397 A | 6/1995 | Lee |
| 5,473,383 A | 12/1995 | Sezan et al. |
| 5,495,593 A * | 2/1996 | Elmer et al. ................. 711/103 |
| 5,521,644 A | 5/1996 | Sezan et al. |
| 5,543,925 A * | 8/1996 | Timmermans ............... 386/40 |
| 5,548,135 A * | 8/1996 | Avery ........................ 257/173 |
| 5,555,098 A * | 9/1996 | Parulski ..................... 386/104 |
| 5,642,262 A * | 6/1997 | Terrill et al. ................. 361/783 |
| 5,682,205 A | 10/1997 | Sezan et al. |
| 5,689,305 A | 11/1997 | Ng et al. |

(Continued)

OTHER PUBLICATIONS

Internet pages from Pixelworks Inc. website www.pixelworksinc.com, first page entitled "PixelWorks Products", 3 pages, printed out Jun. 27, 2002.

(Continued)

*Primary Examiner*—Victor Kostak

(57) ABSTRACT

A display processor integrated circuit (for example, for a television or for a digital camera) includes a display processor portion and an on-chip programmable logic portion. The on-chip programmable logic portion can be configured or programmed to implement custom video and/or image enhancement functions. Accordingly, an individual television or camera manufacturer can have his/her own custom enhancement function incorporated into the display processor integrated circuit by having the programmable logic portion configured or programmed appropriately. In one embodiment, the programming of the programmable logic portion involves changing just one mask, thereby reducing the cost, complexity and time associated with implementing the custom video/image enhancement function.

19 Claims, 7 Drawing Sheets

U.S. PATENT DOCUMENTS

| | | | |
|---|---|---|---|
| 5,732,246 A | 3/1998 | Gould et al. | |
| 5,835,864 A * | 11/1998 | Diehl et al. | 725/140 |
| 5,892,966 A * | 4/1999 | Petrick et al. | 712/36 |
| 5,909,244 A * | 6/1999 | Waxman et al. | 348/222.1 |
| 5,922,047 A * | 7/1999 | Newlin et al. | 709/217 |
| 5,931,934 A * | 8/1999 | Li et al. | 710/260 |
| 5,956,744 A * | 9/1999 | Robertson et al. | 711/122 |
| 5,982,459 A * | 11/1999 | Fandrianto et al. | 348/425.3 |
| 5,990,858 A * | 11/1999 | Ozolins | 345/99 |
| 6,011,408 A * | 1/2000 | Kolze | 326/41 |
| 6,026,227 A * | 2/2000 | Furtek et al. | 716/16 |
| 6,115,066 A * | 9/2000 | Gowda et al. | 348/308 |
| 6,133,957 A | 10/2000 | Campbell | |
| 6,134,379 A * | 10/2000 | LaMacchia | 386/54 |
| 6,150,837 A | 11/2000 | Beal et al. | |
| 6,166,773 A | 12/2000 | Greggain et al. | |
| 6,175,390 B1 * | 1/2001 | Kim et al. | 348/725 |
| 6,189,064 B1 | 2/2001 | MacInnis et al. | |
| 6,252,906 B1 | 6/2001 | Canfield | 375/240.21 |
| 6,272,451 B1 * | 8/2001 | Mason et al. | 703/13 |
| 6,275,259 B1 * | 8/2001 | Gowda et al. | 348/229.1 |
| 6,310,659 B1 | 10/2001 | Glen | |
| 6,334,207 B1 | 12/2001 | Joly et al. | |
| 6,339,434 B1 | 1/2002 | West et al. | 345/667 |
| 6,348,949 B1 | 2/2002 | McVeigh | |
| 6,356,313 B1 | 3/2002 | Champion et al. | |
| 6,407,775 B1 | 6/2002 | Frink et al. | |
| 6,421,094 B1 | 7/2002 | Han | |
| 6,426,649 B1 * | 7/2002 | Fu et al. | 326/41 |
| 6,446,192 B1 * | 9/2002 | Narasimhan et al. | 712/29 |
| 6,486,889 B1 | 11/2002 | Meyers et al. | |
| 6,552,410 B1 * | 4/2003 | Eaton et al. | 257/530 |
| 6,567,768 B1 * | 5/2003 | Matos et al. | 702/187 |
| 6,577,345 B1 | 6/2003 | Lim, II et al. | |
| 6,625,788 B1 | 9/2003 | Vashi et al. | |
| 6,694,491 B1 | 2/2004 | Osann, Jr. et al. | |
| 6,744,917 B1 | 6/2004 | Sadowski et al. | |
| 6,748,286 B1 * | 6/2004 | Losch | 700/97 |
| 6,769,109 B2 | 7/2004 | Osann, Jr. et al. | |
| 6,788,573 B2 * | 9/2004 | Choi | 365/185.05 |
| 6,829,010 B1 * | 12/2004 | Suzuki | 348/335 |
| 6,848,055 B1 * | 1/2005 | Yarch | 713/300 |
| 6,943,820 B2 * | 9/2005 | Schmidt | 348/64 |
| 6,992,713 B2 * | 1/2006 | McCaffrey et al. | 348/254 |
| 7,055,125 B2 | 5/2006 | Osann, Jr. et al. | |
| 7,142,882 B2 * | 11/2006 | Schmidt | 455/552.1 |
| 7,165,230 B2 | 1/2007 | Park | |
| 7,202,908 B2 | 4/2007 | Zhou et al. | |
| 2001/0013123 A1 * | 8/2001 | Freeman et al. | 725/34 |
| 2002/0050518 A1 * | 5/2002 | Roustaei | 235/454 |
| 2002/0059481 A1 * | 5/2002 | Nunally | 710/5 |
| 2002/0184452 A1 | 12/2002 | Simmons et al. | |
| 2003/0018398 A1 * | 1/2003 | Juntunen et al. | 700/24 |
| 2003/0025811 A1 * | 2/2003 | Keelan et al. | 348/239 |
| 2003/0080971 A1 * | 5/2003 | Hochmuth et al. | 345/619 |
| 2003/0093806 A1 * | 5/2003 | Dureau et al. | 725/107 |
| 2003/0121057 A1 * | 6/2003 | Singh | 725/132 |
| 2003/0190157 A1 * | 10/2003 | Aubry et al. | 386/124 |
| 2003/0212979 A1 | 11/2003 | Osann, Jr. et al. | |
| 2004/0100421 A1 * | 5/2004 | Webb et al. | 345/10 |
| 2005/0030425 A1 | 2/2005 | Nagakura et al. | |
| 2005/0280438 A1 | 12/2005 | Park | |
| 2009/0128699 A1 | 5/2009 | Nagakura et al. | |

OTHER PUBLICATIONS

Internet pages from of Genesis Microchip Inc. www.genesis-microchip.com, first page entitled Genesis Any Source—Any Display—gm6010 Digital TV Controller, 4 pages, downloaded Jun. 27, 2002.

Trident DPTV-iX Preliminary Product Brief from Trident Microsystems, Inc., 12 pages, dated Nov. 2001.

Genesis FLI2300 Digital Video Format Converter Product Brief from Genesis Microchip Inc., 2 pages, printed out Jun. 27, 2002.

Genesis gm6010 and gm6015 Product Brief from Genesis Microchip Inc., 2 pages, printed out Jun. 27, 2002.

U.S. Appl. No. 10/150,685, entitled "Distrubuted RAM In A Logic Array", 21 pages (and filing receipt), filed May 17, 2002.

U.S. Appl. No. 10/164,455, entitled "Cell Architecture To Reduce Customization In A Semiconductor Device", 33 pages (and filing receipt), filed Jun. 6, 2002.

NuCORE SiP-1250 Smart Image Processor product description by NuCORE Technology Inc., 2 pages, printed out Jul. 23, 2002.

Powell, Gary "Method and Appartus for Converting Field-Programmable Gate Array Implementations into Mask-Programmable Logic Cell Implementations", U.S. Appl. No. 08/175,658, Abandoned.

"Non-Final Office Action", U.S. Appl. No. 11/732,434, (Mar. 22, 2010), 5 pages.

"Non Final Office Action", U.S. Appl. No. 12/356,057, (May 20, 2010), 5 pages.

* cited by examiner

ONE EXAMPLE OF AN ENHANCEMENT

ONE MACROCELL

MACROCELL ROUTING

INTERFACE CELLS WITH
ROUTING CHANNELS

IC DISPOSED IN
A CAMERA

IC DISPOSED IN
A CAMCORDER

DISPLAY PROCESSOR INTEGRATED CIRCUIT WITH ON-CHIP PROGRAMMABLE LOGIC FOR IMPLEMENTING CUSTOM ENHANCEMENT FUNCTIONS

BACKGROUND INFORMATION

FIG. 1 (Prior Art) is a simplified system level diagram of the electronics of a standard television 1. An incoming signal is received, for example via an antenna 2 or a coaxial cable 3. The signal passes through a tuner 4, a demodulator 5, an analog-to-digital converter 6, and a display processor 7. Display processor 7 is typically a commercially available off-the-shelf integrated circuit. Display processors are available from numerous manufacturers including Genesis Microchip Inc., Pixelworks Inc, Trident Microsystems Inc., and Silicon Image Inc. Display processor 7 may, for example, implement certain picture enhancement algorithms. Frames of video information are stored in an external RAM 8. Display processor 7 also interfaces to a microcontroller 9. Enhanced video features such as Picture-In-Picture (PIP), Picture-Out-Picture (POP), Cinema 1, Cinema 2, format conversion, film detection, panorama scaling, alpha blending and overlay, VBI/Closed Captioning, and On-Screen Display (OSD) may be controlled through microcontroller 9. The output of display processor 7 passes through driver electronics 10 and to the display device. The display device may, for example, be a cathode ray tube (CRT) 11, a liquid crystal display (LCD) screen 12, or a plasma display 16. Audio passes through audio circuitry 13 and to speaker 14.

An individual television manufacturer may, however, want to implement a custom video enhancement algorithm and/or other special feature. Such a custom enhancement feature may be implemented for branding purposes and to provide a measure of distinction over televisions made by other manufacturers. To facilitate implementing such custom algorithms, an interface is provided on display processor 7 so that display processor 7 can be coupled with a custom external device such as an application specific integrated circuit (ASIC), specially-configured field programmable gate array (FPGA) 15, DSP, or microprocessor. The custom enhancement algorithm is performed by the external device, and the resulting processed information is communicated back to display processor 7 for output to the display device.

There are numerous such custom video enhancement algorithms. One particular example relates to a particular LCD display that can be driven. To make the LCD display look brighter, the LCD power amplifiers of the LCD are specially tuned in accordance with this enhancement technique based on characteristics of the video signal. When this is done, the LCD display looks brighter.

DETAILED DESCRIPTION

Figure 1:
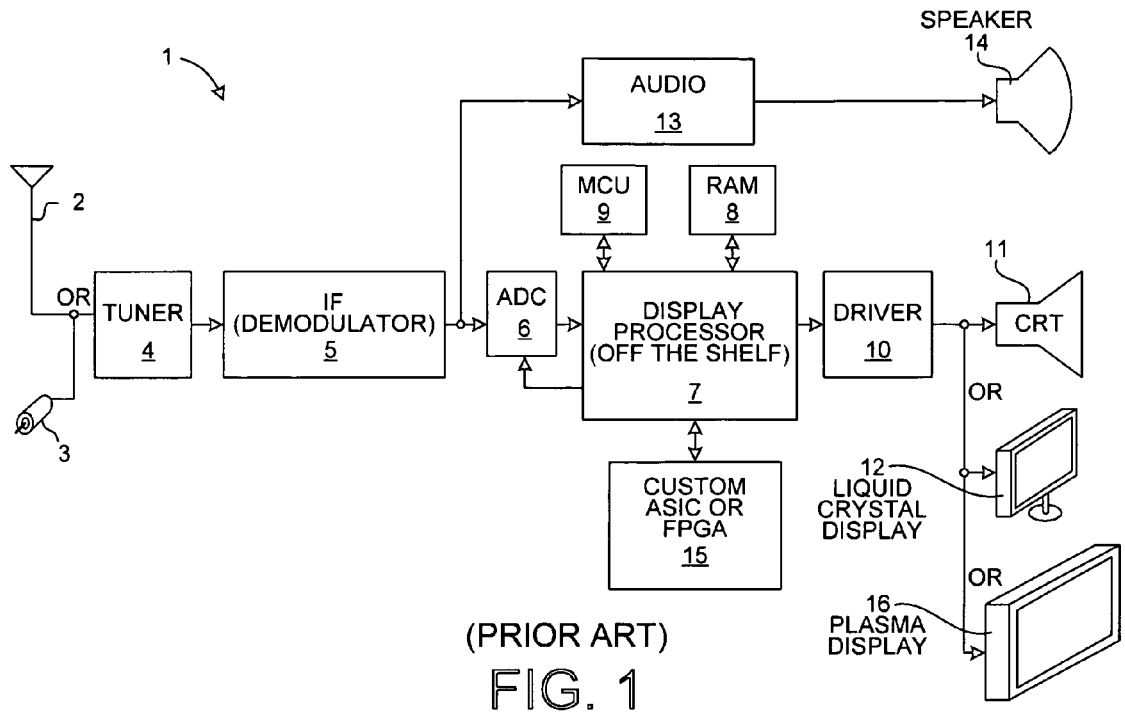
FIG. 1 (Prior Art) is a simplified diagram of the electronics of a conventional television.

Although the provision of ASIC or FPGA 15 in the television of FIG. 1 works satisfactorily in many cases to allow individual television manufacturers to implement their own custom enhancements, the incorporation of additional ASIC or FPGA or DSP integrated circuit chips into each television produced increases manufacturing costs. Increasing manufacturing cost in a high-volume consumer product such as a television is highly undesirable. Not only does the inclusion of ASIC or FPGA or DSP 15 into each television increase manufacturing cost, but the turn-around time required to redesign and retest an ASIC may be significant. It may, for example, take six months to a year to "turn-around" a custom ASIC (to identify a flaw in the ASIC design, to redesign the ASIC accordingly, to remanufacture the redesigned ASIC, and to retest and requalify the fixed ASIC design). Such a long turn-around time to design a new television or to fix a bug or design flaw may adversely impact the product design cycle. A solution is desired.

Figure 2:
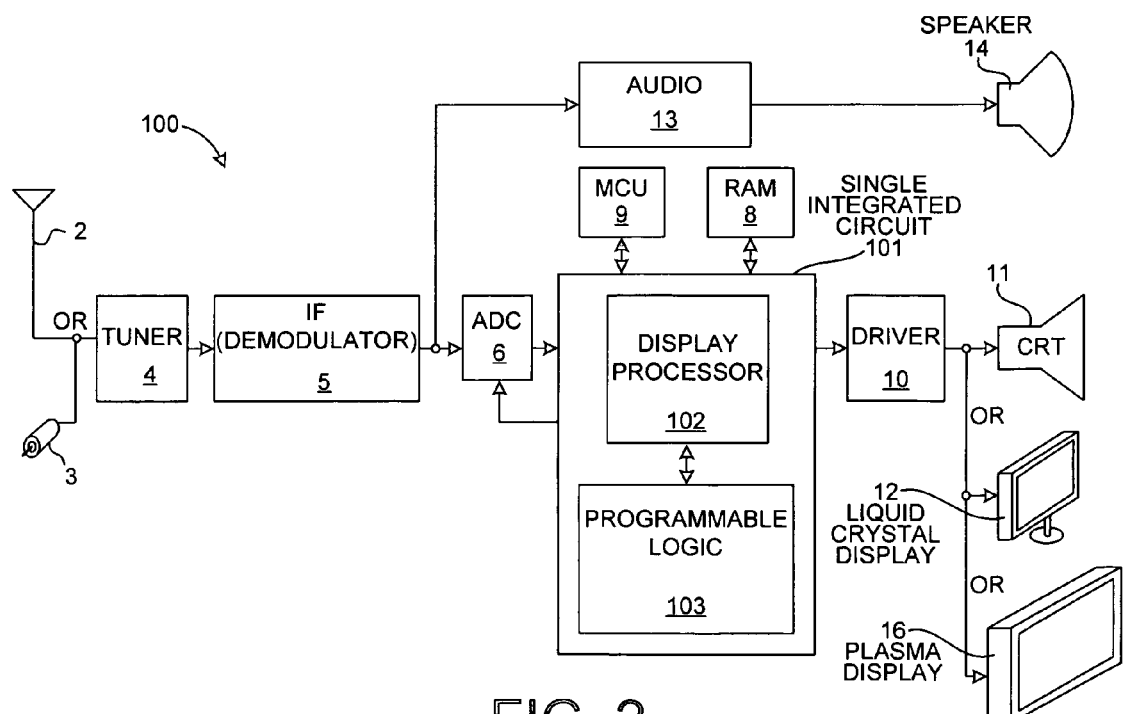
FIG. 2 is a simplified block diagram of the electronics of a television 100 in accordance with one particular embodiment of the present invention.

FIG. 2 is a simplified diagram of a television 100 in accordance with an embodiment of the present invention. Television 100 is substantially the same as the television in FIG. 1, except that the display processor 7 and the ASIC or FPGA or DSP 15 in the television of FIG. 1 are replaced with a single integrated circuit 101. For example, television 100 receives an NTSC or a PAL signal. Integrated circuit 101 includes both a display processor portion 102 as well as an on-chip programmable logic portion 103. Programmable logic portion 103 in the example of FIG. 2 contains an amount of logic functionally equivalent to approximately 50,000 gates. The on-chip programmable logic portion 103 can be programmed or otherwise configured to implement a custom video enhancement function desired by an individual television manufacturer. Accordingly, the same or substantially the same integrated circuit design can be sold to multiple television manufacturers thereby facilitating high volume manufacturing and decreased per-part cost.

In one embodiment, the programming of the programmable logic portion 103 involves changing just one mask used in the manufacturing process, thereby reducing the cost and complexity and time associated with configuring the programmable logic portion 103. The ability to manufacture and configure/program integrated circuit 101 may be licensed to an individual television manufacturer such that the individual television manufacturer can mask-program and manufacture customized integrated circuits 101. In another embodiment, integrated circuit 101 is programmable by a television manufacturer such that the television manufacturer purchases unprogrammed but otherwise completed devices, and then after taking delivery programs those devices to implement his/her own custom video enhancement functions. Alternatively, integrated circuits 101 may be manufactured with their programmable logic portions 103 being customized for various television manufacturers, and the so-customized integrated circuits 101 are then delivered to the appropriate television manufacturers.

Figure 3:
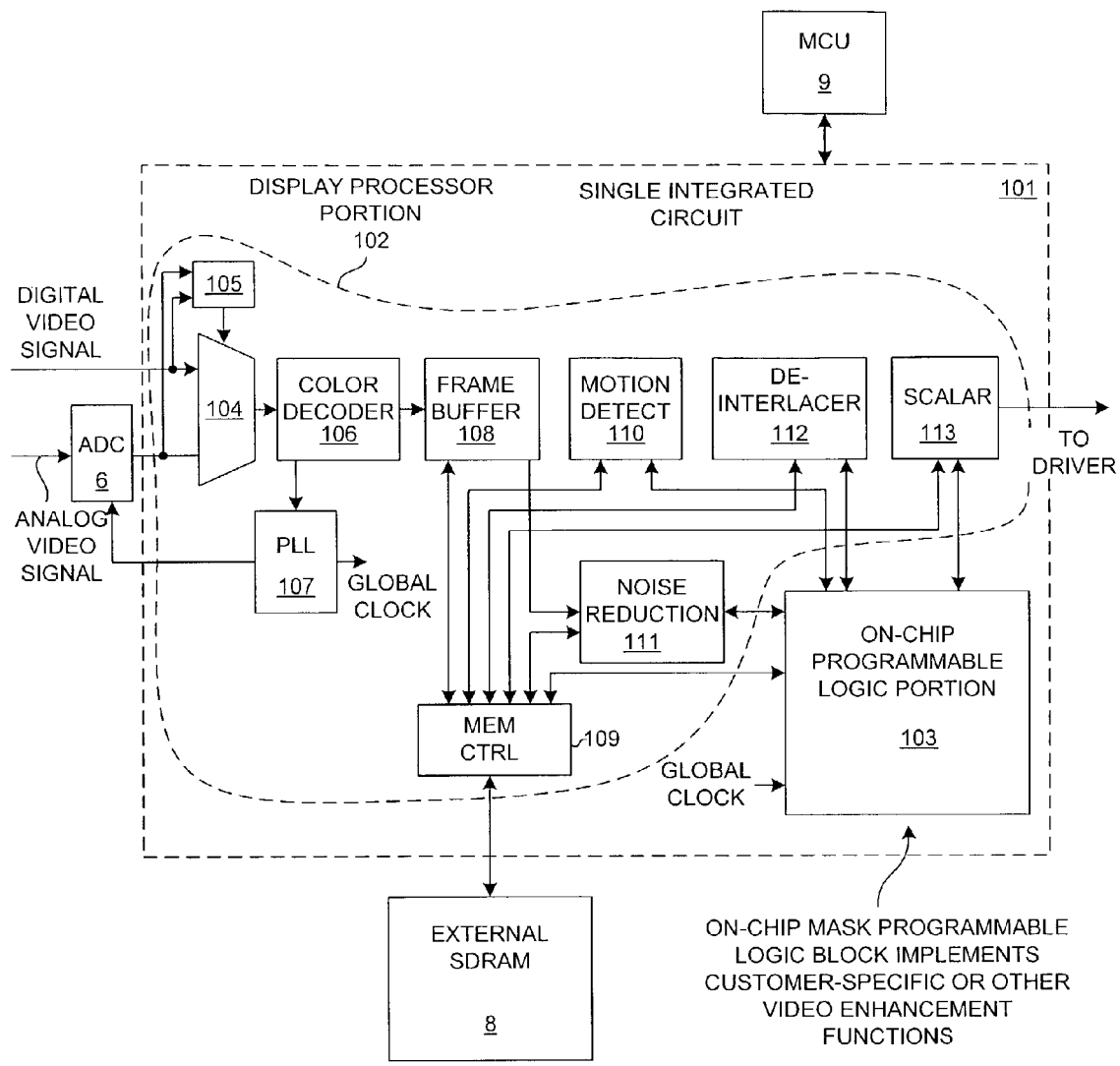
FIG. 3 is a simplified block diagram of integrated circuit 101 of FIG. 2.

FIG. 3 is a conceptual view of integrated circuit 101. Display processor portion 102 includes multiplexer 104, a signal detector multiplexer control block 105, a color decoder block 106, a phase-locked loop block 107, a frame buffer block 108, a memory controller block 109 a motion detect block 110, a noise reduction block 111, a de-interlacer block 112, and a scalar block 113. The design of the display processor portion 102 need not have this particular topology, however. The circuitry of display processor portion 102 may, for example, be implemented along the lines of known display processors such as the Trident DPTV Video Processor, the Genesis GM6010 Digital TV Controller, and the Pixelworks PW105 Display Processor.

The same standard techniques used to implement custom enhancement algorithms and features into ASIC or FPGA or DSP 15 may be used to implement custom enhancement algorithms and features into on-chip programmable logic portion 103. For example, in one embodiment an enhancement function to be implemented is described in verilog, and a circuit synthesizer is then used to convert the verilog output into a file that configures the particular hardware building blocks available in programmable logic portion 103 so as to realize a particular hardware circuit that implements the described enhancement function.

In another embodiment, the enhancement function to be implemented is described in verilog and the verilog file is synthesized. Place and route software is then executed to generate a GDS output file that represents final routing of programmable logic portion 103. This GDS file is then merged with a GDS file for the remainder of integrated circuit 101. The resulting merged GDS file is used to make a mask for a layer of conductive vias. Fabrication of this one layer of conductive vias is what results in the customization of programmable logic portion 103. All the other layers of integrated circuit 101 are the same, regardless of how programmable logic portion 103 is customized.

Figure 4:
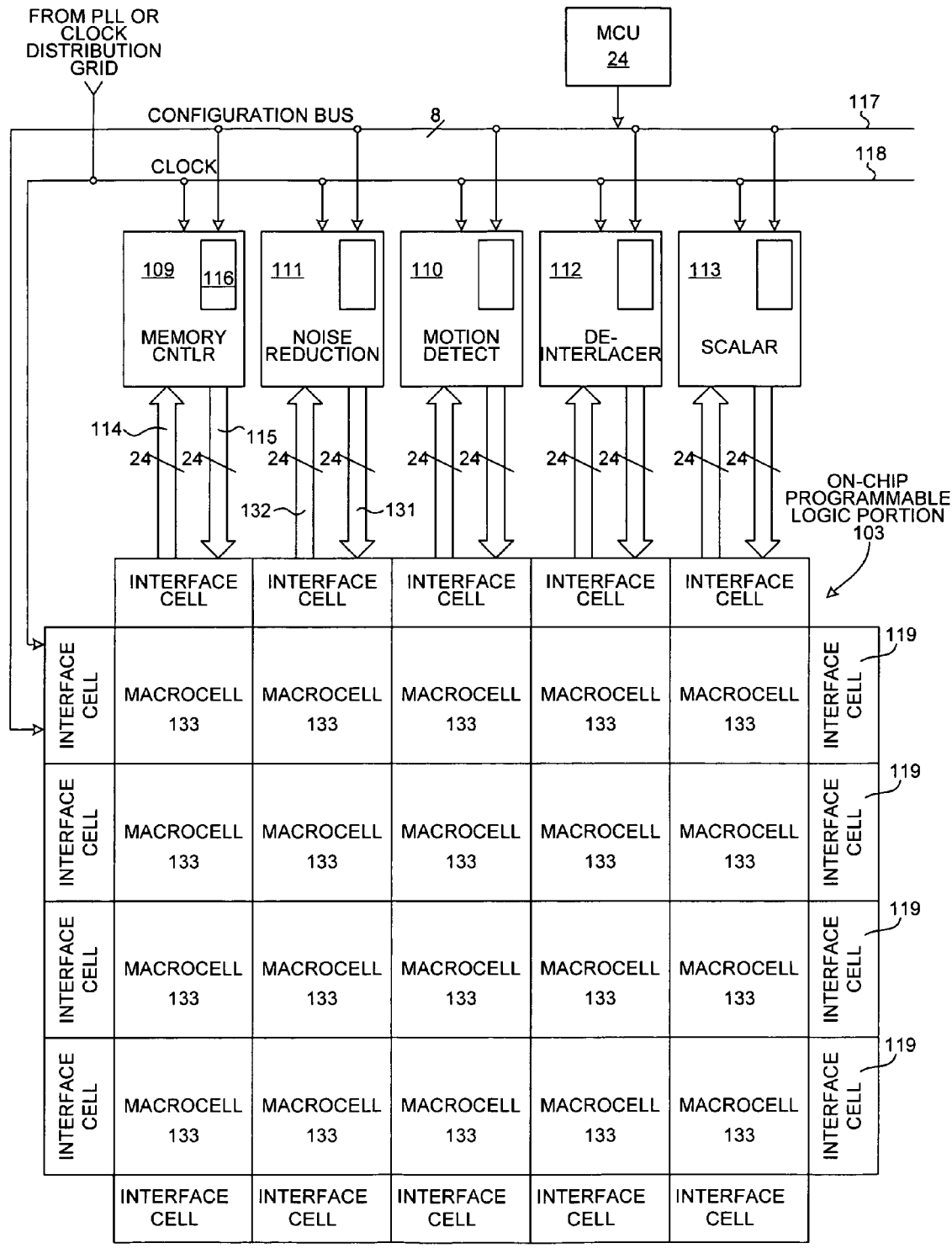
FIG. 4 is a more detailed diagram showing the interface between programmable logic portion 103 and the rest of the blocks in integrated circuit 101.

FIG. 4 is a more detailed diagram showing the interface between programmable logic portion 103 and blocks 109-113 in integrated circuit 101. Each of blocks 109-113 is interfaced to programmable logic portion 103 by its own 24-bit parallel input bus and its own 24-bit parallel output bus. Each of blocks 109-113 has its own configuration register. For example, memory controller block 109 is interfaced to programmable logic portion 103 via its own input bus 115 and its own output bus 114. Memory controller block 109 also has its own configuration register 116. To configure and/or to control one of these blocks 109-113, MCU 24 writes an appropriate configuration value into the configuration register of the block to be configured via configuration bus 117. Each of the blocks also receives a global clock signal from PLL block 107 via clock bus 118. MCU 9 controls the sequence by which the various blocks manipulate and process the video data.

Figure 5:
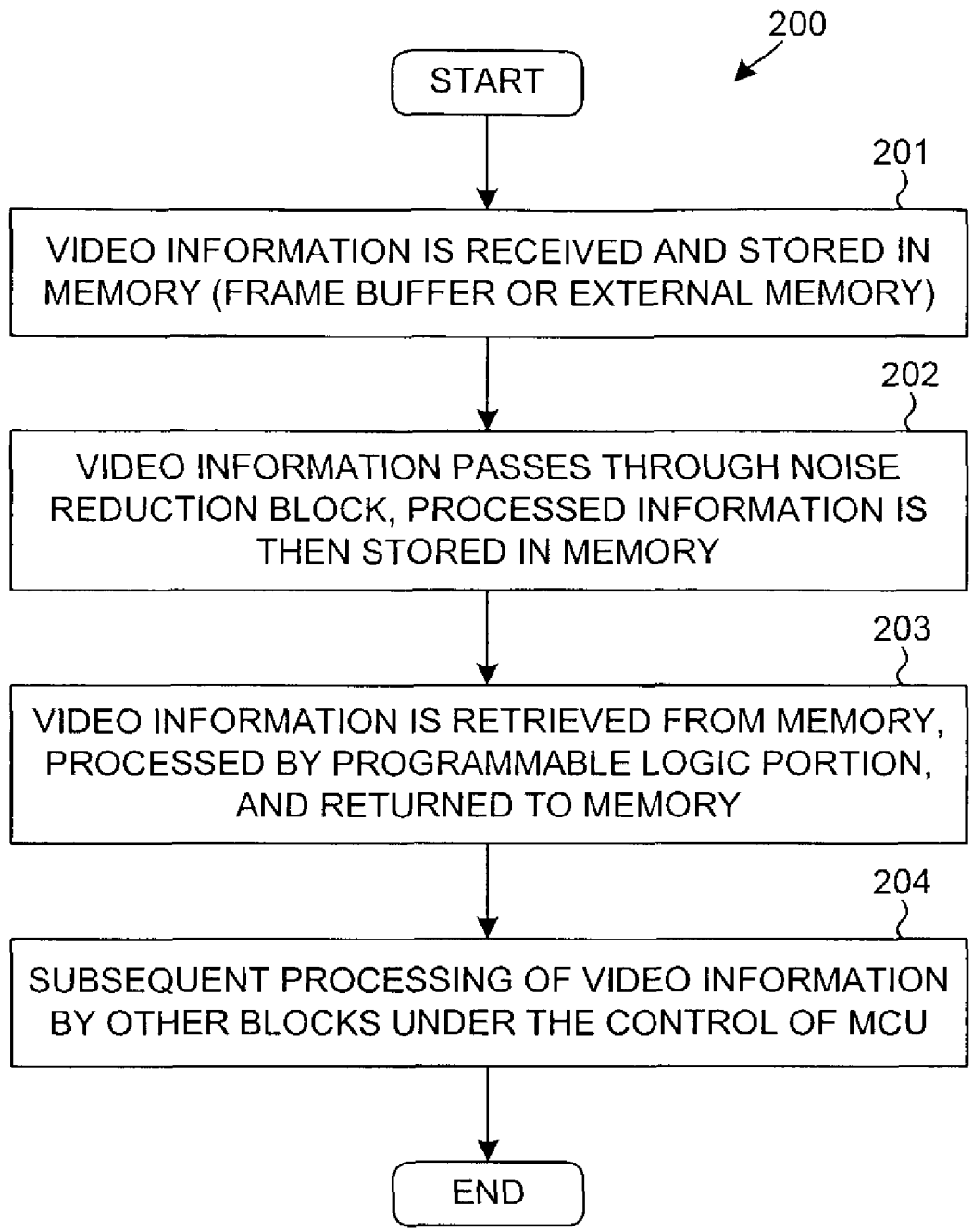
FIG. 5 is a flowchart of a method in accordance with one particular embodiment of the present invention.

FIG. 5 is a flow chart of a method 200 of one particular custom enhancement algorithm that may be implemented by integrated circuit 101. The video information as it is received is written into frame buffer 108 (step 201). A function of frame buffer 108 is to act as a cache. It may, for example, be able to store four frames of video. System external SDRAM, on the other hand, has the capacity to store from six to twenty frames of video. Next (step 202), under control of MCU 9, video information is processed through noise reduction block 111. The resulting processed data is then written back into either frame buffer 108 and/or external SDRAM 8.

Next, in an ordinary system, MCU 9 would ordinarily cause motion detect block 110 to act next on the video information. Motion detect block 110, however, is only configurable to adjust the intensity of the video signal within a particular range. In the present example, an individual television manufacturer wishes to increase the intensity of the video signal beyond the range provided by the general purpose motion detect block 110.

In accordance with an embodiment of the present invention, programmable logic portion 103 is configured/programmed to increase the intensity of the signal as desired. The video information is retrieved from either frame buffer 108 and/or external SDRAM 8 by memory controller block 109. The video information passes to (step 203) programmable logic portion 103 via input bus 115 (see FIG. 4). Programmable logic portion 103 processes the video information and the resulting processed video passes through output bus 114 to memory controller block 109 and is then written to either the frame buffer 108 and/or external SDRAM 8.

Subsequent processing (step 204) needed is then performed under the control of MCU 9. In the present example, standard de-interlacing and scaling of the video information is performed under the control of MCU 9 by de-interlacer and scalar blocks 112 and 113.

The example of FIG. 5 describes programmable logic portion 103 receiving frames of video information from memory (via memory controller block 109), processing the video information, and then returning the video information back to the memory (via memory controller block 109). In addition to this mechanism, programmable logic portion 103 can also receive video information from one of blocks 110-113, process the video information, and return the processed information back to the block. Noise reduction block 111 may, for example, perform initial noise reduction and then pass the video information to programmable logic portion 103 via bus 131. Programmable logic portion 103 does subsequent noise reduction and returns the processed information back to noise reduction block 111 via bus 132. In a third mechanism, programmable logic portion 103 receives video information from one of blocks 110-113, processes the video information, and returns the processed video information back to memory or to another of the blocks. Accordingly, in one case the programmable logic portion 103 receives the information to be processed from memory, processes the information, and returns the processed information back to memory. In another case, programmable logic portion 103 receives the video information to be processed from another of the blocks 110-113, processes the video information, and returns the processed video information back to a block (back to either the block from which the video information originated or back to another block).

Figure 6:
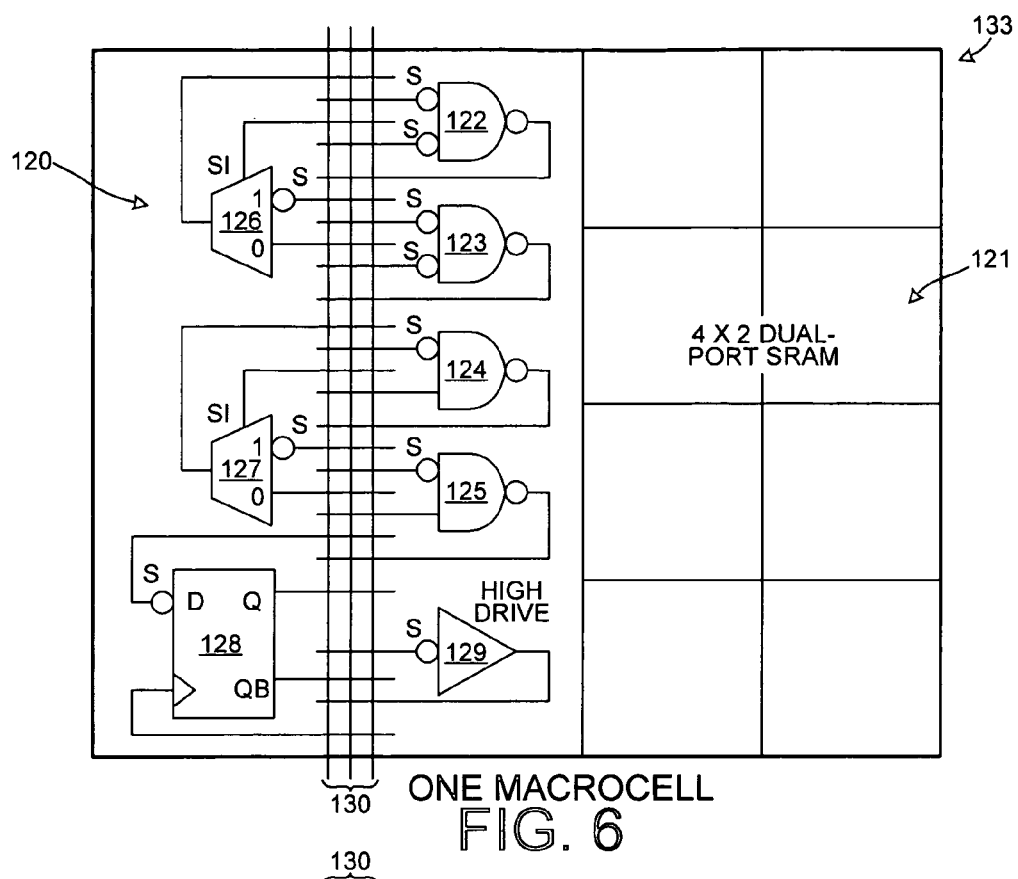
FIG. 6 is a simplified diagram of a macrocell of the programmable logic portion 103.

In FIG. 4, programmable logic portion 103 includes an array of macrocells 133 surrounded by a ring of interface cells 119. FIG. 6 is a simplified diagram of a macrocell 133. Macrocell 133 includes a logic portion 120 and a dual-port SRAM portion 121. Logic portion 120 includes four NAND gates 122-125, two 2-to-1 multiplexers 126 and 127, a D type flip-flop 128 with scan capability, and high drive buffer/inverter 129. In FIG. 6, the bubble symbol designated with an "S" indicates selectable inversion. Input leads and output leads of these logic elements extend in one direction in a first metal layer (the horizontal direction in the illustration) such that they cross perpendicularly (the vertical direction in the illustration) extending routing conductors 130 in a second metal layer. The GDS file described above determines whether conductive vias are placed at intersections of the various leads and routing conductors.

Figure 7:
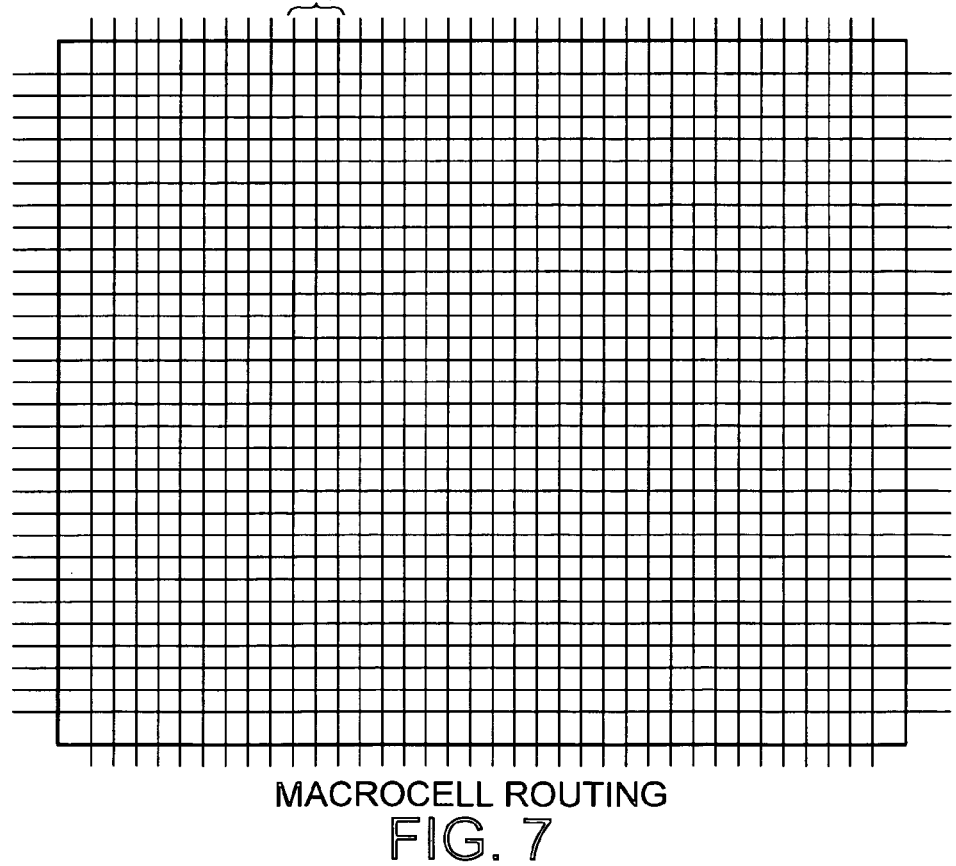
FIG. 7 is a simplified diagram showing vertical and horizontal routing extending across the macrocell of FIG. 5.

FIG. 7 is a simplified diagram showing vertical and horizontal routing extending across the macrocell 133 of FIG. 6. Many of the routing conductors extend across only one macrocell. In order to form a longer conductor across programmable logic portion 103, vias are placed between colinear routing conductors of adjacent macrocells so as to couple the routing conductors in end-to-end fashion. Although not illustrated in FIG. 6, some of the routing conductors span multiple macrocells (for example, span across two adjacent macrocells, four adjacent co-linear macrocells, six adjacent co-linear macrocells).

Figure 8:
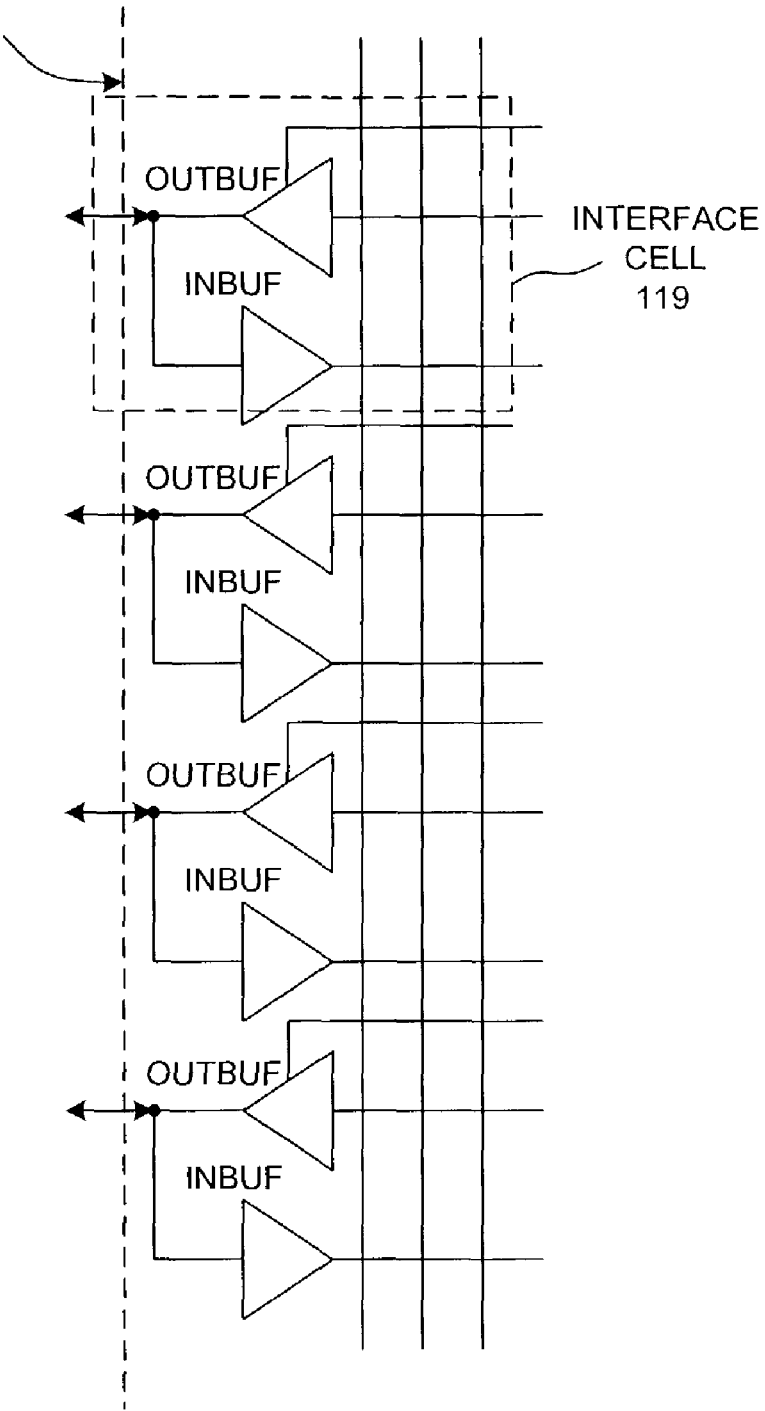
FIG. 8 is a simplified diagram showing a plurality of interface cells (and their associated routing channels) of programmable logic block 103.
Figure 9:
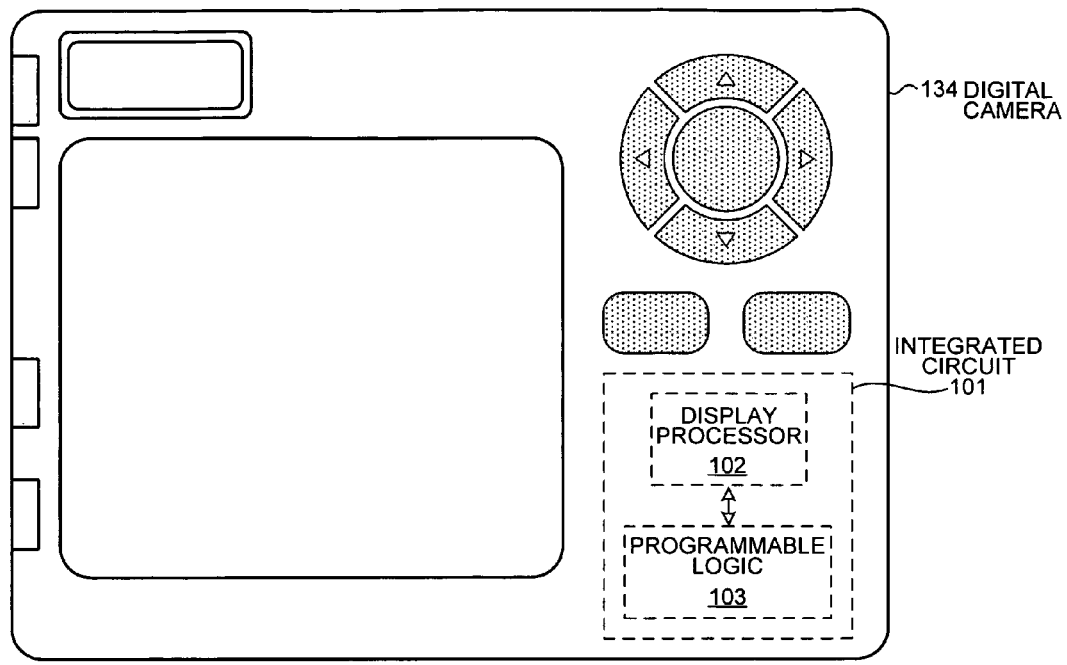
FIG. 9 is a diagram showing an integrated circuit with a display processor and programmable logic disposed in a digital camera.
Figure 10:
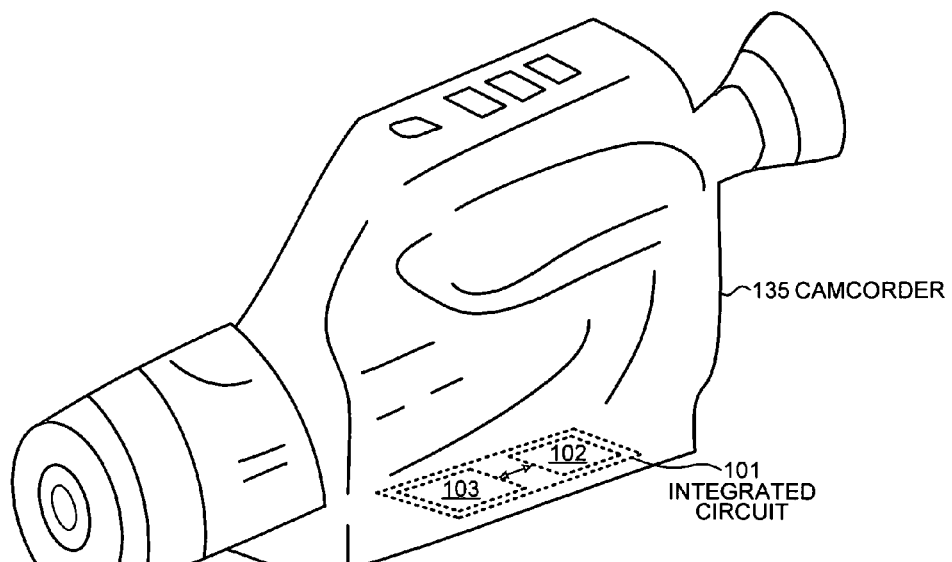
FIG. 10 is a diagram showing an integrated circuit with a display processor and programmable logic disposed in a camcorder.

FIG. 8 is a simplified diagram of some of the interface cells 119 of programmable logic portion 103. Each interface cell includes a tri-statable output buffer (OUTBUF) and an input buffer (INBUF). Each cell can be configured as an input cell, an output cell, or an input/output (I/O) cell by providing conductive vias at the appropriate crossings of the input and output leads of the logic elements (horizontally extending leads in the diagram of FIG. 8) and the perpendicularly extending routing conductors (vertically extending conductors in the diagram of FIG. 8).

In one embodiment, the programmable logic portion 103 is realized as set forth in: 1) U.S. patent application Ser. No. 10/164,455, entitled "Cell Architecture To Reduce Customization In A Semiconductor Device", filed Jun. 6, 2002, now U.S. Pat. No. 6,580,289 B2 and 2) U.S. patent application Ser. No. 10/150,685, entitled "Distributed Ram In A Logic Array", filed May 17, 2002, now U.S. Pat. No. 6,693,454 (the contents of these two documents is incorporated herein by reference).

In one embodiment, integrated circuit 101 is embodied within a digital camera. Digital still image information from the digital camera is supplied to integrated circuit 101 via multiplexer 104. Display processor portion 102 in this example includes standard circuitry employed by camera manufacturers for picture/image processing. An example of such standard circuitry is embodied in a chip (SiP-1250Processor chip) produced by NuCORE Technology Inc. In this example involving a digital camera, the programmable logic portion 103 is customized by an individual camera manufacturer to implement a desired enhancement algorithm. Examples of image enhancement algorithms are skin tone detection algorithms, color correction algorithms, gamma correction algorithms, edge enhancement algorithms, and NTSC/PAL encoders. The output of integrated circuit 101 is, in one example, supplied to a television so that enhanced digital pictures and/or enhanced video taken with the digital camera can be displayed on the television Although the present invention is described in connection with certain specific embodiments for instructional purposes, the present invention is not limited thereto. Programmable logic portion 103 may be implemented using any suitable programmable logic architecture, including for example an SRAM-based FPGA or PLD core, an antifuse-based FPGA or PLD core, an EEPROM-based FPGA or PLD core, a Flash-based FPGA or PLD core, or a mask-programmable logic core. Specialized logic structures and/or specialized memory structures may be provided in order to speed up circuit operation and/or to reduce the amount of chip area required to implement a particular enhancement function. Multiple on-chip programmable logic blocks may be provided. Enhancement circuitry may be designed, hot-spots in the circuitry identified, and then custom circuitry provided in programmable logic portion 103 in order to better implement the enhancement circuitry (for example, to reduce size, reduce manufacturing cost, reduce power consumption, increase operating speed, facilitate compatibility with interfaces and communication standards, and so forth). Color decoder block 106 may, in some embodiments, be an external component. Accordingly, various modifications, adaptations, and combinations of various features of the described embodiments can be practiced without departing from the scope of the invention as set forth in the following claims.

What is claimed is:

1. A display processor integrated circuit, comprising:
a display processor configured to process video; and
programmable logic integrated with the display processor, the programmable logic comprising an array of macrocells surrounded by a ring of interface cells that are adjacent to the macrocells, wherein the programmable logic is unprogrammed when manufacture of the display processor integrated circuit is completed, and wherein the programmable logic is programmable to implement at least one of multiple video enhancement algorithms configured to enhance the video when the display processor integrated circuit is implemented after manufacture in a device configured to display the video.

2. The display processor integrated circuit of claim 1, wherein the multiple video enhancement algorithms include at least one of a peaking algorithm, a brightness enhancing algorithm, a sharpness enhancing algorithm, an upscaling algorithm, a downscaling algorithm, a 2:2 pulldown algorithm, a 3:2 pulldown algorithm, or a VBI information extracting algorithm.

3. The display processor integrated circuit of claim 1, wherein the display processor integrated circuit is configured to:
receive the video from an analog-to-digital converter; and
output processed and enhanced video to a display driver including at least one of a CRT driver, an LCD driver, or a plasma display driver.

4. The display processor integrated circuit of claim 1, wherein the device configured to display the video is an HDTV, the display processor is further configured to process high-definition television video in the HDTV, and wherein the programmable logic is further programmable to enhance the high-definition television video.

5. The display processor integrated circuit of claim 1, wherein the device configured to display the video is a digitally-enhanced television, the display processor integrated circuit is part of the digitally-enhanced television, and wherein the digitally-enhanced television receives the video as at least one of an NTSC signal or a PAL signal.

6. The display processor integrated circuit of claim 1, wherein the programmable logic comprises at least one of an antifuse-based programmable logic core or a Flash-based programmable logic core.

7. The display processor integrated circuit of claim 1, wherein the programmable logic comprises a dual-port SRAM memory.

8. The display processor integrated circuit of claim 1, wherein the programmable logic comprises a configurable SRAM memory block having a configurable width.

9. The display processor integrated circuit of claim 1, wherein the display processor comprises a memory controller configured to interface with an external memory coupled to the programmable logic.

10. The display processor integrated circuit of claim 1, wherein the programmable logic comprises logic functionally equivalent to approximately at least 50,000 gates.

11. The display processor integrated circuit of claim 1, wherein the programmable logic is programmable by customizing only one mask of a multi-mask process used to fabricate the display processor integrated circuit.

12. The display processor integrated circuit of claim 1, wherein each of the macrocells comprises a dual-port SRAM memory.

13. An integrated circuit, comprising:
a display processor configured to process digital images; and
programmable logic integrated with the display processor, the programmable logic comprising an array of macrocells surrounded by a ring of interface cells that are adjacent to the macrocells, wherein the programmable logic is unprogrammed when manufacture of the integrated circuit is completed, and wherein the programmable logic is programmable to implement at least one of multiple image enhancement algorithms configured to enhance the digital images when the integrated circuit is implemented after manufacture in a device configured to at least one of process or display the digital images.

14. The integrated circuit of claim 13, wherein the multiple image enhancement algorithms include at least one of a skin tone detection algorithm, a color correction algorithm, a gamma correction algorithm, an edge enhancement algorithm, or an NTSC/PAL encoder.

15. The integrated circuit of claim 13, wherein the programmable logic comprises at least one of an antifuse-based programmable logic core or a Flash-based programmable logic core.

16. The integrated circuit of claim 13, wherein the programmable logic comprises a dual-port SRAM memory.

17. The integrated circuit of claim 13, wherein the programmable logic comprises a configurable SRAM memory block having a configurable width.

18. The integrated circuit of claim 13, wherein the display processor comprises a memory controller configured to interface with an external memory coupled to the programmable logic.

19. The integrated circuit of claim 13, wherein the programmable logic is programmable by customizing only one mask of a multi-mask process used to fabricate the integrated circuit.

* * * * *